United States Patent
Alurkar et al.

(10) Patent No.: US 12,113,639 B2
(45) Date of Patent: Oct. 8, 2024

(54) ARCHIVING BASED ON GEOGRAPHIC REGION

(71) Applicant: Zoom Video Communications, Inc., San Jose, CA (US)

(72) Inventors: Aakash Atul Alurkar, Irvine, CA (US); Adi David Regev, Fair Lawn, NJ (US)

(73) Assignee: Zoom Video Communications, Inc., San Jose, CA (US)

( * ) Notice: Subject to any disclaimer, the term of this patent is extended or adjusted under 35 U.S.C. 154(b) by 82 days.

(21) Appl. No.: 17/877,892

(22) Filed: Jul. 30, 2022

(65) Prior Publication Data

US 2023/0033552 A1 Feb. 2, 2023

Related U.S. Application Data

(63) Continuation-in-part of application No. 17/332,993, filed on May 27, 2021.

(51) Int. Cl.
*H04L 12/18* (2006.01)
*G06F 16/11* (2019.01)
*H04W 4/02* (2018.01)

(52) U.S. Cl.
CPC ........ *H04L 12/1831* (2013.01); *G06F 16/113* (2019.01); *H04W 4/02* (2013.01)

(58) Field of Classification Search
CPC ..... H04L 12/1831; G06F 16/113; H04W 4/02
See application file for complete search history.

(56) References Cited

U.S. PATENT DOCUMENTS

| | | | | |
|---|---|---|---|---|
| 10,015,169 B2* | 7/2018 | Kennedy | ............... | G06F 21/55 |
| 10,972,413 B2* | 4/2021 | Pamidiparthi | ........ | H04L 51/214 |
| 11,061,991 B2* | 7/2021 | Murphy | ................ | H04L 67/02 |
| 11,087,019 B2* | 8/2021 | Levy | ..................... | H04L 63/20 |
| 11,720,707 B2* | 8/2023 | Levy | ................. | H04L 12/1831 726/1 |
| 2005/0113025 A1* | 5/2005 | Akamatsu | ......... | H04N 1/00408 455/41.3 |
| 2010/0106923 A1* | 4/2010 | Backa | .................. | G06F 16/113 711/E12.001 |
| 2013/0090973 A1* | 4/2013 | Hui | ..................... | G06Q 10/109 705/1.1 |

(Continued)

*Primary Examiner* — Todd L Barker
(74) *Attorney, Agent, or Firm* — Kilpatrick Townsend & Stockton LLP

(57) ABSTRACT

Various embodiments of an apparatus, method(s), system(s) and computer program product(s) described herein are directed to a Geographic Archiving Engine. The Geographic Archiving Engine identifies a geographical region associated with a regulated user account requesting access to a virtual meeting. The Geographic Archiving Engine instantiates a regional virtual meeting participant instance for the identified geographical region. The Geographic Archiving Engine captures, via the regional virtual meeting participant instance, a communication channel(s) of the virtual meeting. The Geographic Archiving Engine generates an archival file(s) based on the communication channel data captured by the regional virtual meeting participant instance. The Geographic Archiving Engine generates a translated file(s) by applying a compliance policy, associated with a regulated user account(s), to the one or more archival files.

20 Claims, 8 Drawing Sheets

(56) References Cited

U.S. PATENT DOCUMENTS

| | | | | |
|---|---|---|---|---|
| 2016/0070812 A1* | 3/2016 | Murphy | ............... | G06F 21/6218 |
| | | | | 707/608 |
| 2017/0208105 A1* | 7/2017 | Katekar | .............. | H04L 12/1827 |
| 2017/0359551 A1* | 12/2017 | Shaw | ...................... | H04N 7/152 |
| 2020/0057866 A1* | 2/2020 | Levy | .................... | G06F 21/6245 |
| 2020/0204509 A1* | 6/2020 | Pamidiparthi | ......... | G06Q 10/10 |
| 2021/0334405 A1* | 10/2021 | Levy | ........................ | H04L 67/14 |
| 2022/0385758 A1* | 12/2022 | Tadesse | ................. | G10L 15/26 |
| 2023/0334173 A1* | 10/2023 | Levy | ................... | G06F 21/6245 |

* cited by examiner

ARCHIVING BASED ON GEOGRAPHIC REGION

FIELD

Various embodiments relate generally to digital communication, and more particularly, to online video and audio.

SUMMARY

The appended Abstract may serve as a summary of this application.

BRIEF DESCRIPTION OF THE DRAWINGS

The present disclosure will become better understood from the detailed description and the drawings, wherein.

DETAILED DESCRIPTION OF THE DRAWINGS

Figure 1A:
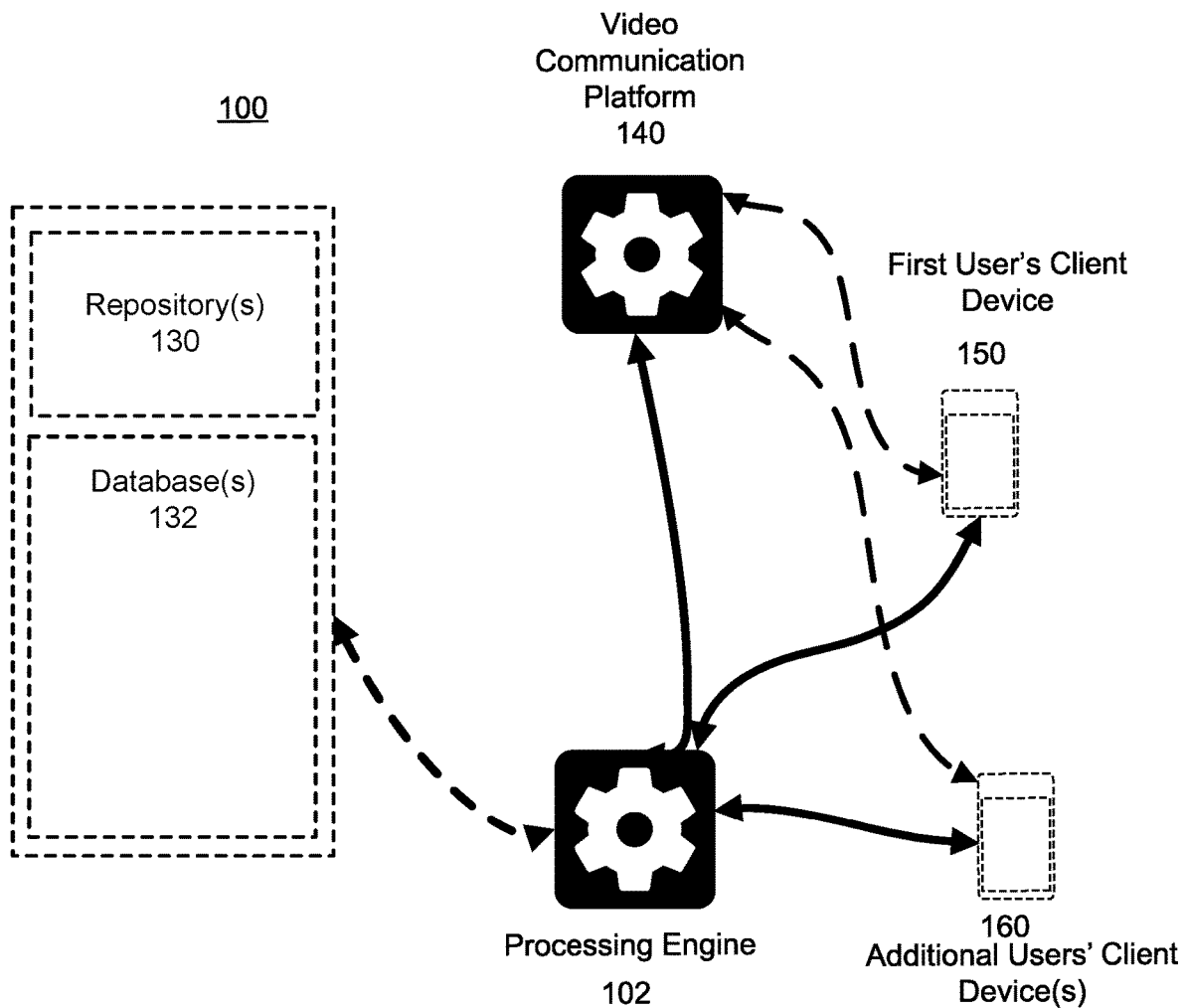
FIG. 1A is a diagram illustrating an exemplary environment in which some embodiments may operate.

Various embodiments of a Geographic Archiving Engine are described herein that provide functionality for the identification, storage and archiving of compliance data required by differing compliance policies associated with multiple regulated user accounts, from various geographical regions, that joined the same virtual meeting.

In one or more embodiments, the Geographic Archiving Engine instantiates an invisible virtual meeting participant on a per-region basis (hereinafter "regional bot") based on each geographical region associated with one or more regulated user accounts that are requesting access to (and/or joining) a virtual meeting. The Geographic Archiving Engine uses each respective regional bot to captures virtual meeting data. The virtual meeting data may be, for example, audio, video and chat data.

In various embodiments, the Geographic Archiving Engine instantiates a first regional bot based on detecting of a first regulated user account that is an initial regulated user account from a first geographical region to request access to (and/or join) the virtual meeting. If the Geographic Archiving Engine detects additional regulated user account from the first geographical region requesting access to (and/or joining) the virtual meeting, the Geographic Archiving Engine further utilizes the same first regional bot to capture virtual meeting data on behalf of those additional regulated user accounts from first geographical region.

When there are multiple regulated user accounts from the first geographical region participating in the virtual meeting, the Geographic Archiving Engine utilizes the first regional bot to capture the virtual meeting join and exit times of each respective regulated user account from the first geographical region. The Geographic Archiving Engine further utilizes the first regional bot to capture an initial join time and a last exit time. The initial join time is a timestamp representing when a first regulated user account from the first geographical region was the earliest regulated user account to request access to (and/or join) the virtual meeting. The last exit time is a timestamp representing when a last regulated user account from the first geographical region was the latest (or last) regulated user account to leave the virtual meeting. The first regional bot further captures the virtual meeting data until the virtual meeting is terminated regardless of a regulated user account's last exit time.

Upon termination of the virtual meeting, the Geographic Archiving Engine creates a copy of the virtual meeting data for each regulated user account from the first geographical region. The Geographic Archiving Engine trims a respective copy of virtual meeting data for a regulated user account based on that regulated user account's join and exit times. The Geographic Archiving Engine thereby generates a separate virtual meeting data file for each regulated user account from the first geographical region via deployment of a single regional bot for that first geographical region. The Geographic Archiving Engine stores each regulated user account's distinct virtual meeting data file in a storage location for the first geographical region.

It is understood that, in various embodiments, capture of virtual meeting data, copying of virtual meeting data, trimming of virtual meeting data copies an storage of such trimmed copies may be executed via one or more software modules that correspond with the appropriate geographical region.

Various embodiments of an apparatus, method(s), system(s) and computer program product(s) described herein are directed to a Geographic Archiving Engine. The Geographic Archiving Engine identifies a geographical region associated with a regulated user account requesting access to a virtual meeting. The Geographic Archiving Engine instantiates a regional virtual meeting participant instance for the identified geographical region. The Geographic Archiving Engine captures, via the regional virtual meeting participant instance, a communication channel(s) of the virtual meeting. The Geographic Archiving Engine generates an archival file(s) based on the communication channel data captured by the regional virtual meeting participant instance. The Geographic Archiving Engine generates a translated file(s) by applying a compliance policy, associated with a regulated user account(s), to the one or more archival files.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the invention. The invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1A is a diagram illustrating an exemplary environment in which some embodiments may operate. In the exemplary environment 100, a sending client device 150, one or more receiving client device(s) 160 are connected to a processing engine 102 and, optionally, a communication platform 140. The processing engine 102 is connected to the communication platform 140, and optionally connected to one or more repositories 130 and/or databases 132 of historical virtual online event data, such as historical virtual meeting data One or more of the databases may be combined or split into multiple databases. The sending client device 150 and receiving client device(s) 160 in this environment may be computers, and the communication platform server 140 and processing engine 102 may be applications or software hosted on a computer or multiple computers which are communicatively coupled via remote server or locally.

The exemplary environment 100 is illustrated with only one sending client device, one receiving client device, one processing engine, and one communication platform, though in practice there may be more or fewer sending client devices, receiving client devices, processing engines, and/or communication platforms. In some embodiments, the sending client device, receiving client device, processing engine, and/or communication platform may be part of the same computer or device.

In an embodiment(s), the processing engine 102 may perform methods 500, 600 (of FIGS. 5, 6) or other method herein. In some embodiments, this may be accomplished via communication with the sending client device, receiving client device(s), processing engine 102, communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

Sending client device 150 and receiving client device(s) 160 are devices with a display configured to present information to a user of the device. In some embodiments, the sending client device 150 and receiving client device(s) 160 present information in the form of a user interface (UI) with UI elements or components. In some embodiments, the sending client device 150 and receiving client device(s) 160 send and receive signals and/or information to the processing engine 102 and/or communication platform 140. The sending client device 150 is configured to submit messages (i.e., chat messages, content, files, documents, media, or other forms of information or data) to one or more receiving client device(s) 160. The receiving client device(s) 160 are configured to provide access to such messages to permitted users within an expiration time window. In some embodiments, sending client device 150 and receiving client device(s) are computer devices capable of hosting and executing one or more applications or other programs capable of sending and/or receiving information. In some embodiments, the sending client device 150 and/or receiving client device(s) 160 may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the sending client device 150 and/or receiving client device(s) 160. In some embodiments, one or more of the communication platform 140, processing engine 102, and sending client device 150 or receiving client device 160 may be the same device. In some embodiments, the sending client device 150 is associated with a sending user account, and the receiving client device(s) 160 are associated with receiving user account(s).

In some embodiments, optional repositories function to store and/or maintain, respectively, user account information associated with the communication platform 140, conversations between two or more user accounts of the communication platform 140, and sensitive messages (which may include sensitive documents, media, or files) which are contained via the processing engine 102. The optional repositories may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate communication between two or more parties, such as within a conversation, "chat" (i.e., a chat room or series of public or private chat messages), video conference or meeting, message board or forum, virtual meeting, or other form of digital communication. In some embodiments, the platform 140 may further be associated with a video communication environment and a video communication environment client application executed on one or more computer systems.

Figure 1B:
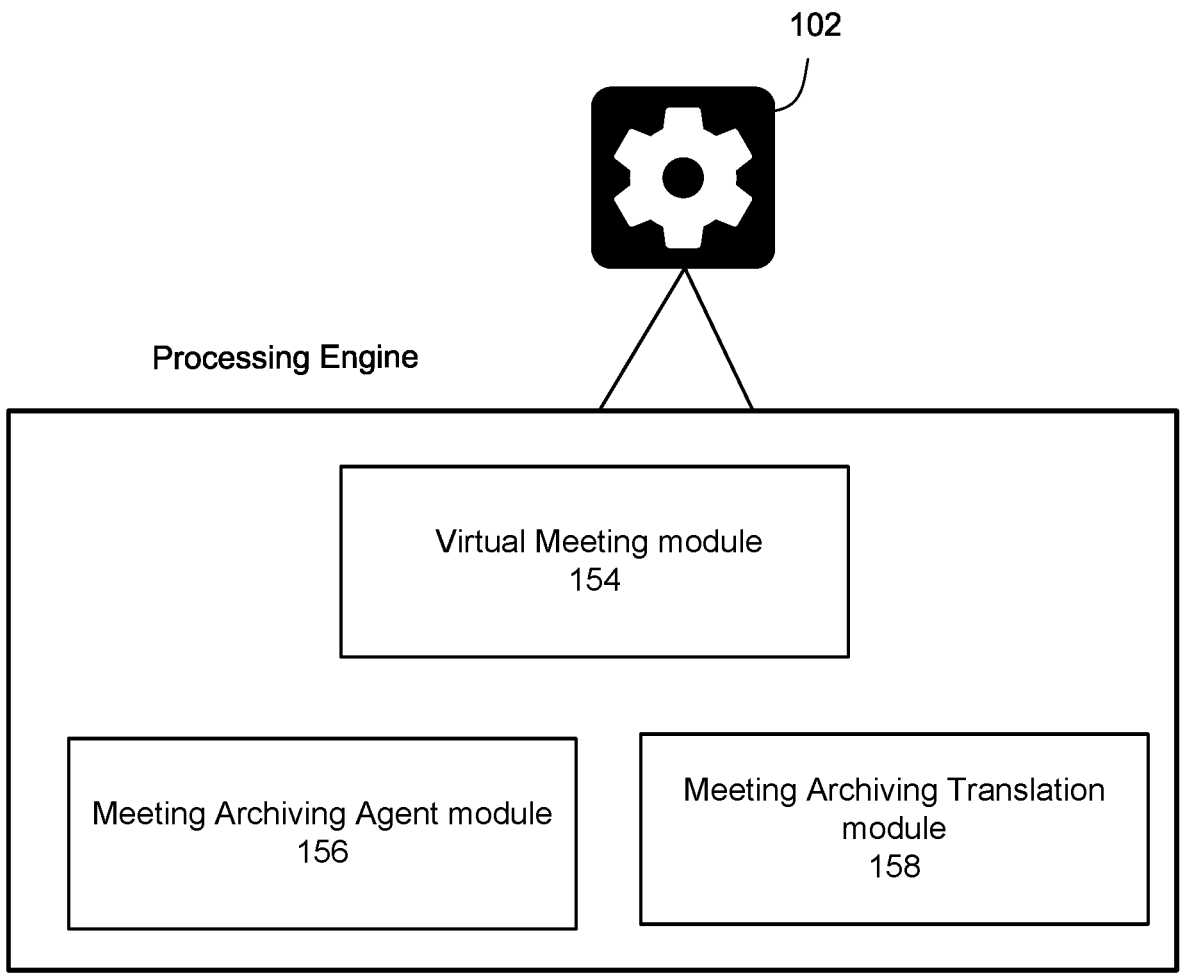
FIG. 1B is a diagram illustrating an exemplary environment in which some embodiments may operate.

FIG. 1B is a diagram illustrating exemplary software modules 154, 156, 158 of a Geographic Archiving Engine that may execute at least some of the functionality described herein. According to some embodiments, one or more of exemplary software modules 154, 156, 158 may be part of the processing engine 102. In some embodiments, one or more of the exemplary software modules 154, 156, 158 may be distributed throughout the communication platform 140

Virtual Meeting module 154 functions to define, support, execute, and/or implement any of the functionalities, acts and/or operations described herein with regard to detecting one or more events of a virtual meeting(s) and/or processing data related to a virtual meeting joined by a regulated user account(s) or hosted by a regulated user account.

Meeting Archiving Agent module 156 functions to define, support, execute, and/or implement any of the functionalities, acts and/or operations described herein with regard to a meeting archiving agent, multimedia recorder and/or a virtual meeting participant bot program.

Meeting Archiving Translation module 158 functions to define, support, execute, and/or implement any of the functionalities, acts and/or operations described herein with regard to the meeting archiving translator, a translated archival file(s), a link(s) for retrieval of a translated archival file and/or metadata related to a translated archival file.

The above modules 154, 156, 158 and their functions will be described in further detail in relation to FIGS. 3, 4, 5, 6.

Figure 2:
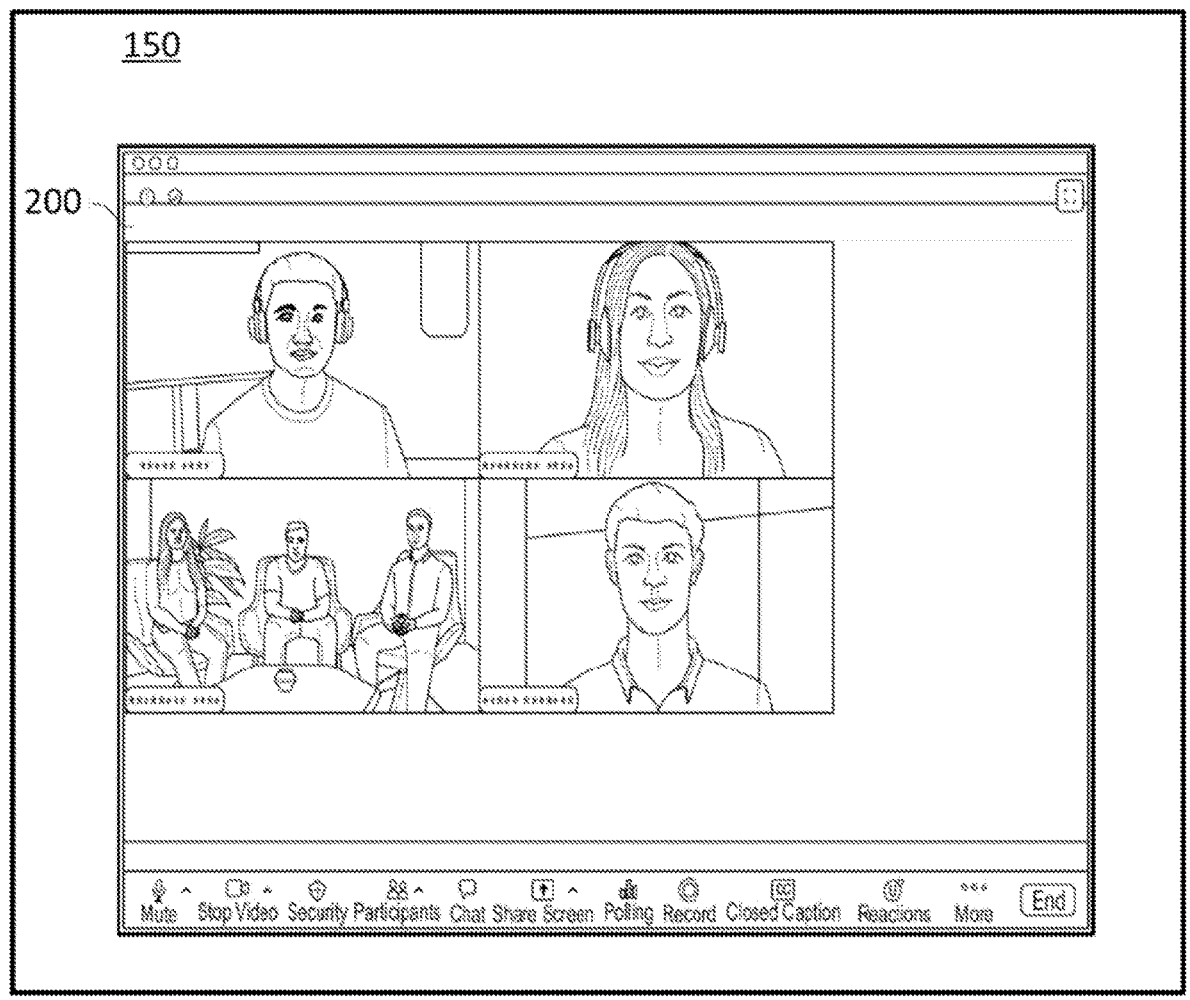
FIG. 2 is a diagram illustrating an exemplary environment in which some embodiments may operate.

As shown in the example of FIG. 2, a user account communications interface 200 for accessing and communicating with the platform 140 and displayed at a computer device 150. The interface 200 provides access to video data, audio data, chat data and meeting transcription related to an online event(s), such as a virtual webinar or a virtual meeting joined by a user account associated with the computer device 150. The interface 200 further provides various types of tools, functionalities, and settings that can be selected by a user account during an online event. Various types of virtual meeting control tools, functionalities, and settings are, for example, mute/unmute audio, turn on/off video, start meeting, join meeting, view and call contacts.

According to various embodiments, a regulated user account that accesses one or more virtual meetings on the platform 140 may be associated with an external organization. The external organization may have various data compliance and data archival policies and requirements. The external organization may partner with a third-party archival vendor system ("vendor") that manages and stores archival data captured per the external organization's policies. In some embodiments, the external organization may be managing its own data archiving program and may be acting as a "vendor" as described herein.

Figure 3:
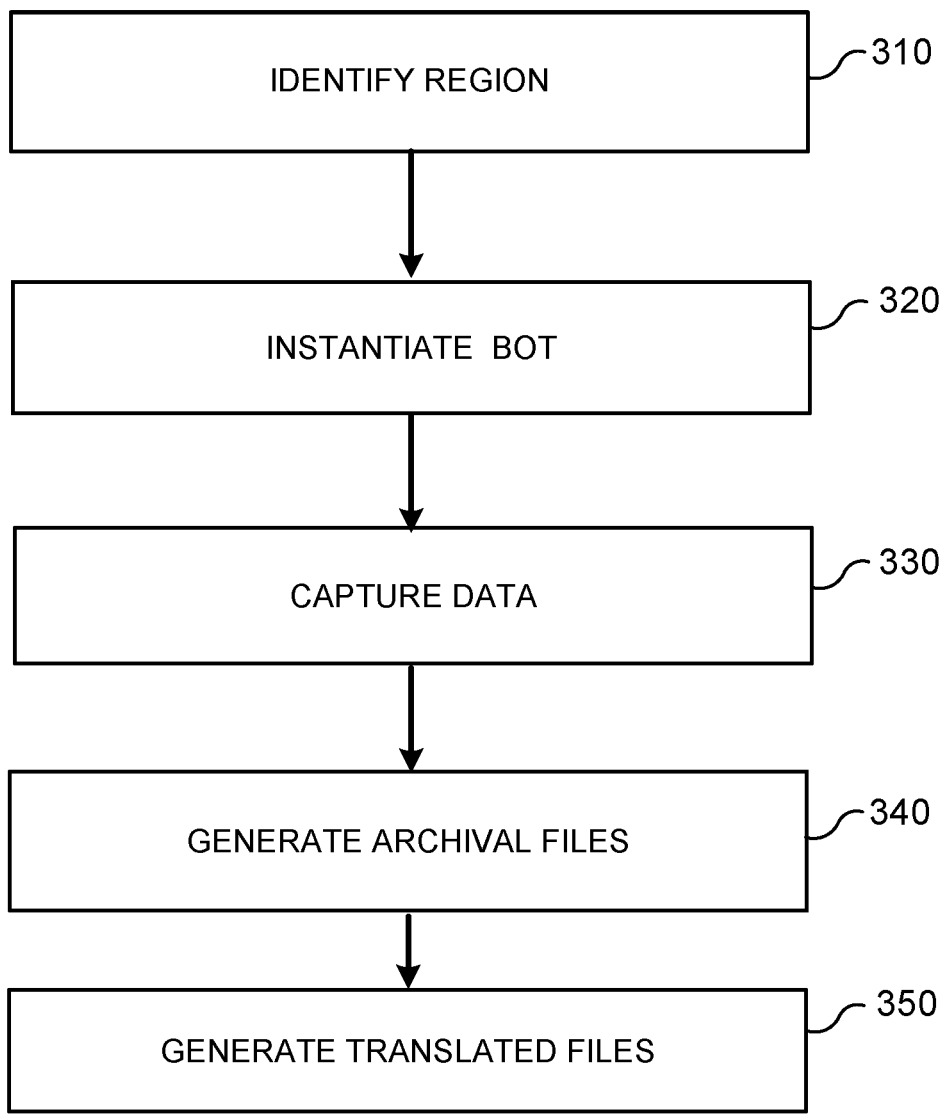
FIG. 3 is a diagram illustrating an exemplary flowchart according to some embodiments.

As shown in flowchart diagram 300 of the example of FIG. 3, the Geographic Archiving Engine identifies a geographical region associated with a regulated user account requesting access to a virtual meeting. (Act 310) According to one or more embodiments, a regulated user account may request access to join a virtual meeting. The requesting regulated user account may further be associated with a geographical region. The Geographic Archiving Engine detects the regulated user account requesting access to the virtual meeting or detects the regulated user account joining the virtual meeting. Based on such detection, the Geographic Archiving Engine determines the regulated user account's geographical region. For example, the Geographic Archiving Engine determines that the regulated user account is associated with a geographical region, such as a particular country/location (i.e. Canada, Mexico, etc.) or a particular region (i.e. Europe, Asia-Pac).

In various embodiments, when a user account requests access to (and/or joins) a virtual meeting, the Geographic Archiving Engine determines whether the user account is a regulated user account. Upon determining the user account is a regulated user account, the Geographic Archiving Engine determines which geographical region corresponds to the regulated user account. For example, the regulated user account may have a user account profile. The user account profile may include one or more attributes representative of the corresponding geographical region.

In some embodiments, a company setting may be applied to a regulated user account's profile. The company setting may indicate one or more geographical regions that require virtual meeting data capture by the Geographic Archiving Engine. A group setting may further be applied to a regulated user account's profile. While the company setting may be a default setting, the group setting indicates that the regulated user account may belong to a sub-set of regulated user accounts that require or do not require virtual meeting data capture by the Geographic Archiving Engine.

The Geographic Archiving Engine instantiates a regional virtual meeting participant instance ("regional bot") for the identified geographical region. (Act 320) The Geographic Archiving Engine determines that the regulated user account is the first regulated user account associated with the determined geographical region to request access to (and/or join) the virtual meeting. Based on determining the regulated user account is the first virtual meeting participant from the determined geographical region, the Geographic Archiving Engine instantiates a virtual meeting participant instance that corresponds with the determined geographical region (hereinafter "regional bot"). The Geographic Archiving Engine executes the regional bot program as an invisible virtual meeting participant that captures virtual meeting data during the virtual meeting. In some embodiments, the regional bot captures voice, video and chat data until the virtual meeting ends.

The Geographic Archiving Engine captures, via the regional virtual meeting participant instance, one or more communication channels of the virtual meeting. (Act 330) The regional bot captures video data and chat data. In some embodiments, the captured video data includes voice data. In some embodiments, the regional bot captures a video data stream, a voice data stream and a chat data stream of the virtual meeting.

The Geographic Archiving Engine generates one or more archival files based on the communication channel data captured by the regional virtual meeting participant instance. (Act 340) According to various embodiments, the Geographic Archiving Engine includes a meeting archiving agent and a meeting archiving translator as a part of an archiving gateway within a communication system (i.e. platform 140). The meeting archiving agent of the Geographic Archiving Engine receives the virtual meeting data captured by the regional bot(s) and stores the virtual meeting data in data storage associated with a geographical region. The virtual meeting data stored in data storage may be one or more archival files based on communication channels data from a virtual meeting attended by one or more regulated user accounts. For example, a first archival file stored in regional data storage may include the recorded video stream of the virtual meeting. It is understood that, in some embodiments, the first archival file further includes voice data of the virtual meeting. A second archival file stored in regional data storage may include recorded chat data from the virtual meeting.

The Geographic Archiving Engine generates one or more translated files by applying a compliance policy associated with at least one of the regulated user accounts to the one or more archival files. (Act 350) The meeting archiving translator applies a compliance policy associated with a regulated user account that joined the virtual meeting. In some embodiments, a first compliance policy associated with a first regulated user account requires voice data from the virtual meeting. In some embodiments, the meeting archiving translator accesses the stored video stream in the first archival file and strips voice data out of the first archival file to generate a translated voice file. The meeting archiving translator places the translated voice file in a regional customer storage location external to the communications system, such as a storage location associated with the vendor and a specific geographical region.

In some embodiments, the meeting archiving translator generates translated archived file(s) according to a particular compliance policy, a link to the translated archived file(s) and metadata for the translated archived file(s). According to some embodiments, the meeting archiving translator accesses a first compliance policy associated with a first regulated user account that joined the virtual meeting. Upon determining that the first compliance policy indicates video data is to be archived in relation to the first regulated user account, the meeting archiving translator transfers the video data in the first archival file stored in the regional data storage. The transferred video data is thereby a translated file. The meeting archiving translator places the translated file in a regional data storage location associated with an organization external to the platform 140. The meeting archiving translator generates a link that references the regional data storage location at which the translated file is stored for access by the external organization (or vendor). In some embodiments, the Geographic Archiving Engine may implement a schedule to permanently delete the raw captured data from the platform 140 after a predetermined expiration date and/or after translated files have been delivered to the vendor.

Figure 4:
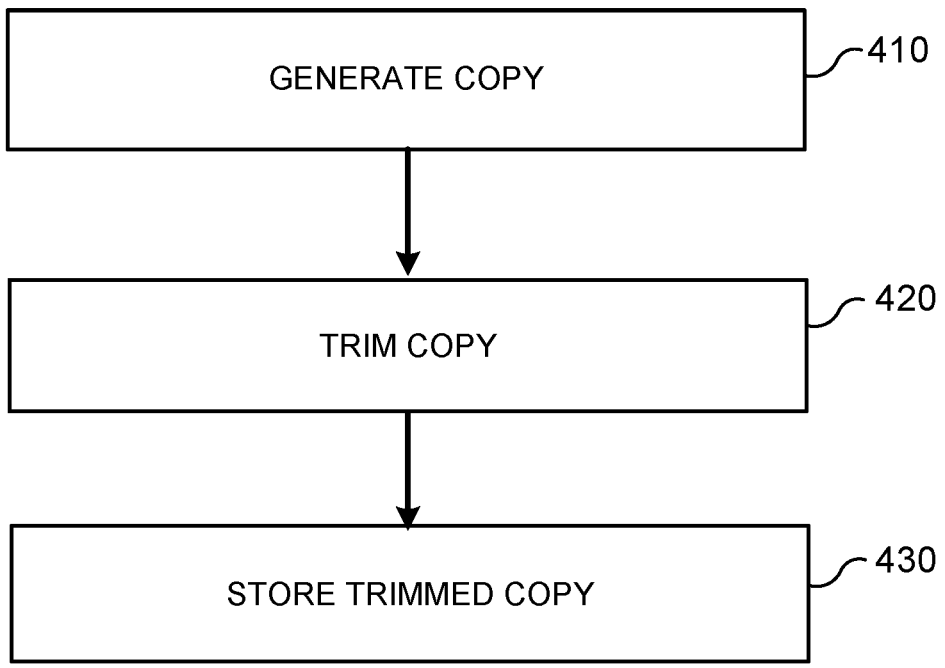
FIG. 4 is a diagram illustrating an exemplary flowchart according to some embodiments.

As shown in flowchart diagram 400 of the example of FIG. 4, the Geographic Archiving Engine generates a copy of the captured communication channel data for each respective regulated user account associated with the same identified geographical region. (Act 410) In various embodiments, after the Geographic Archiving Engine has detected an initial regulated user account to request access to (and/or join) the virtual meeting, a second regulated user account associated with the same geographical region may subsequently join the same virtual meeting. Since the Geographic Archiving Engine has already instantiated the regional bot in response to the initial regulated user account requesting access to (and/or joining) the virtual meeting, the Geographic Archiving Engine further utilizes the already instantiated regional bot to capture virtual meeting data on behalf of the second regulated user account as well. Upon conclusion of the virtual meeting, the Geographic Archiving Engine generates a copy of communication channel data for each regulated user account from the same geographical region. For example, the Geographic Archiving Engine generates a copy of each type of communication channel data. Each regulated user account from the same geographical region will have a copy of captured video data as well as a copy of chat data.

The Geographic Archiving Engine trims reach respective regulated user account's channel data copy based on join and exit times. (Act 420). During the virtual meeting, the regional bot records when each regulated user account from the same geographical region joins and exits the virtual meeting. As such, each regulated user account is associated with a specific time of access of the virtual meeting and a time of exit from of the virtual meeting. For each regulated user account, the Geographic Archiving Engine applies a respective regulated user account's join and exit times to that respective regulated user account's channel data copies. The Geographic Archiving Engine thereby generates one or more archival files for each respective regulated user account based on a range of time that respective regulated user account was participating in the virtual meeting. In some embodiments, the ranges of time may be different as between regulated user account's from the same geographical region. Therefore, a regulated user account's trimmed channel data copies may be longer or shorter that another regulated user account's trimmed channel data copies.

The Geographic Archiving Engine stores each regulated user account's trimmed channel data copy in a storage location that corresponds with the same identified geographical region. (Act 430). The meeting archiving agent transfers each regulated user account's trimmed copies to a data storage associated with same identified geographical region.

Figure 5:
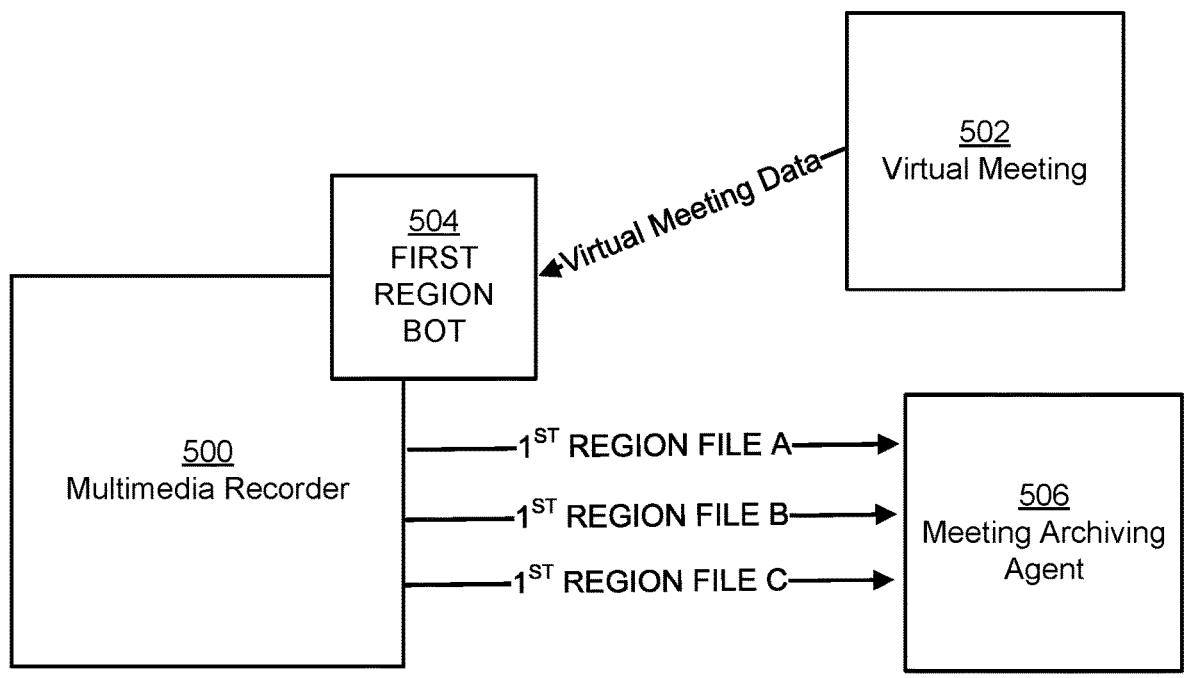
FIG. 5 is a diagram illustrating an exemplary environment in which some embodiments may operate.

As shown in diagram 500 of the example of FIG. 5, a first regional bot 504 associated with a multimedia recorder 500 captures virtual meeting data of a virtual meeting 502. The virtual meeting data may be any type of data such as, for example, one or more of: a video file, an audio file, a transcript file and a .csv file containing polling data from a poll of user accounts that occurred during the virtual meeting. Multiple regulated user accounts may have accessed and/or are currently accessing the virtual meeting 502. For example, three regulated user accounts from the same geographical region may have accessed and/or are currently accessing the virtual meeting 502. Upon termination of the virtual meeting, the Geographic Archiving Engine generates copies of captured virtual meeting data ($1^{st}$ region file A, $1^{st}$ region file B, $1^{st}$ region file C) for each of the three regulated user accounts and further trims the respective copies based on the regulated user accounts join and exit times. The meeting archiving agent 506 receives the trimmed copies.

Figure 6:
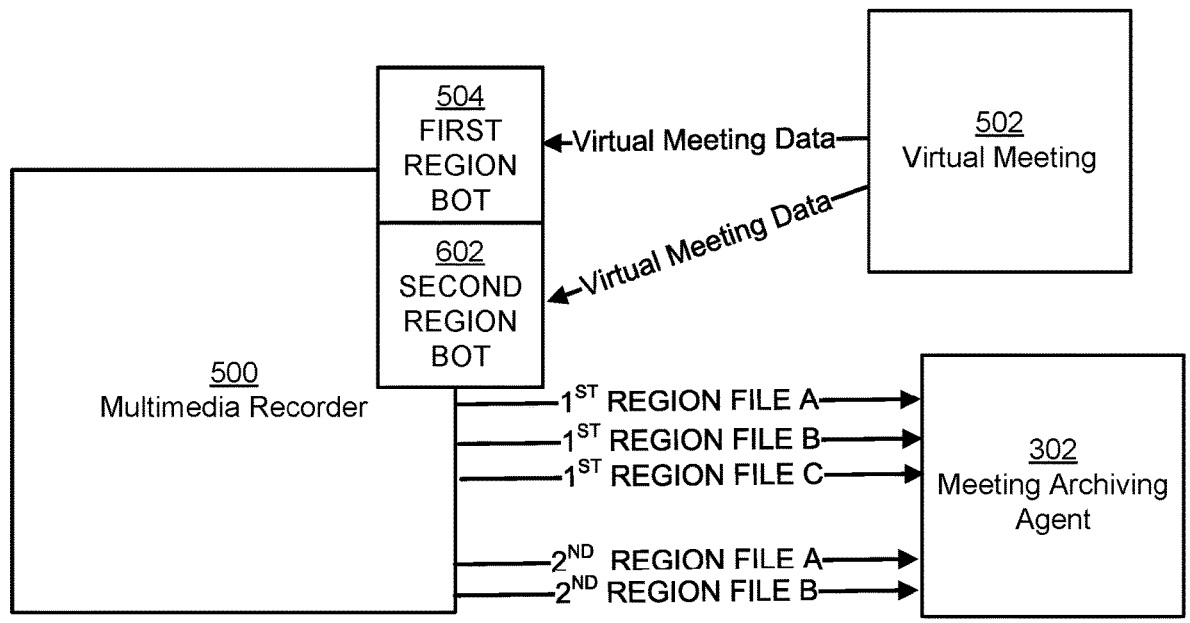
FIG. 6 is a diagram illustrating an exemplary environment in which some embodiments may operate.

As shown in diagram 600 of the example of FIG. 6, the Geographic Archiving Engine may subsequently detect that a third regulated user account requests access to (and/or joins) the same virtual meeting. Based on such detection, the Geographic Archiving Engine determines the third regulated user account's geographical region is different than the geographical region associated with the earlier regulated user accounts and the current regional bot 504. Based on determining the third regulated user account is the first virtual meeting participant from the different geographical region (hereinafter "second geographical region"), the Geographic Archiving Engine instantiates another virtual meeting participant instance 602 that corresponds with the third user account's second geographical region (hereinafter "second regional bot").

Similar to the already-implemented regional bot 504, the Geographic Archiving Engine executes the second regional bot program 602 as an invisible virtual meeting participant that captures virtual meeting data during the virtual meeting. For example, two regulated user accounts from the second geographical region may have accessed and/or are currently accessing the virtual meeting 502. Upon termination of the virtual meeting, the Geographic Archiving Engine generates copies of captured virtual meeting data ($2^{nd}$ region file A, $2^{nd}$ region file B) for each of the two regulated user accounts and further trims the respective copies based on the regulated user accounts join and exit times. The meeting archiving agent 506 receives the $2^{nd}$ region trimmed copies as well.

It is understood that both bots 504, 602 may be instantiated at different times and will both continue to concurrently capture virtual meeting data until termination of the virtual meeting. For example, both bots 504, 602 may concurrently capture virtual meeting data until termination of the virtual meeting—even if all regulated user accounts from the bots' 504, 602 corresponding geographical regions have already exited the virtual meeting prior to termination of the virtual meeting.

Figure 7:
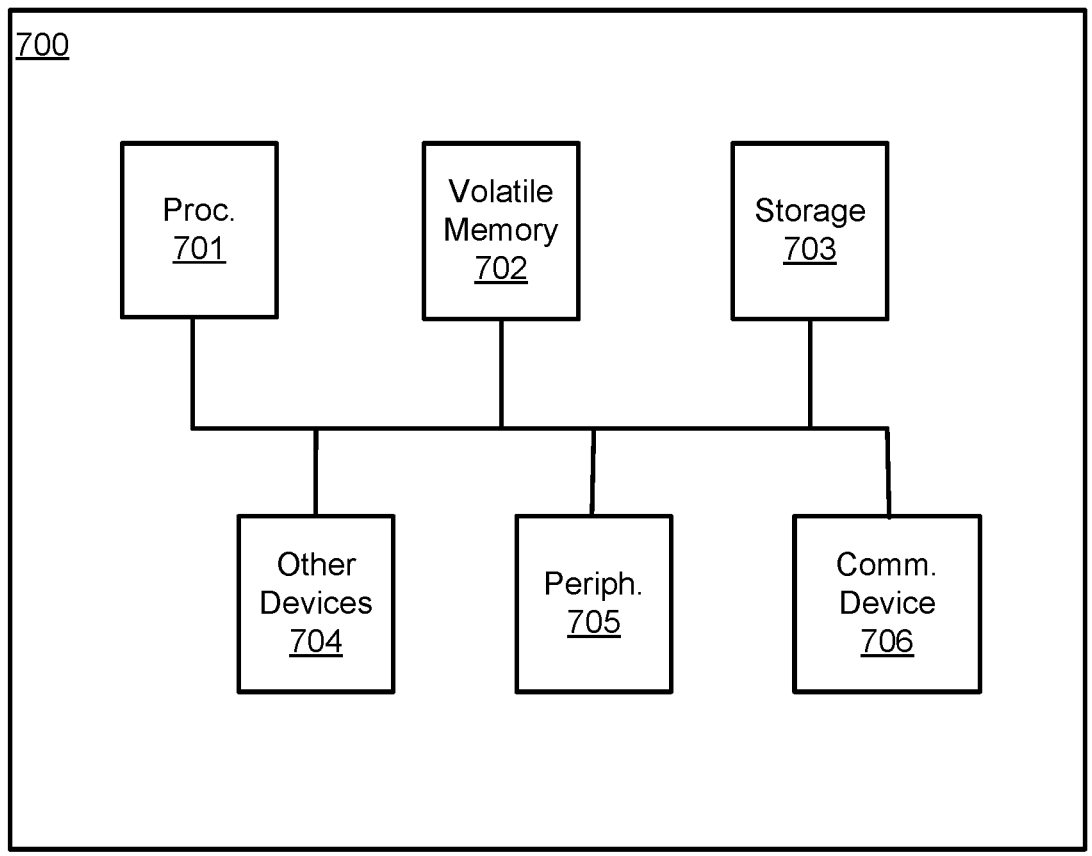
FIG. 7 is a diagram illustrating an exemplary environment in which some embodiments may operate.

FIG. 7 is a diagram illustrating an exemplary computer that may perform processing in some embodiments. As shown in the example of FIG. 7, an exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 7.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-R and DVD-R recorders/players. Communications device 706 may connect the computer 700 to an external medium. For example, communications device 706 may take the form of a network adapter that provides communications to a network. A computer 700 may also include a variety of other devices 704. The various components of the computer 700 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computer device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

It will be appreciated that the present disclosure may include any one and up to all of the following examples.

Example 1: A computer-implemented method comprising: identifying a geographical region associated with a regulated user account requesting access to a virtual meeting; instantiating a regional virtual meeting participant instance for the identified geographical region; capturing, via the regional virtual meeting participant instance, one or more communication channels of the virtual meeting; generating one or more archival files based on the communication channel data captured by the regional virtual meeting participant instance; and generating one or more translated files by applying a compliance policy associated with at least one of the regulated user accounts to the one or more archival files.

Example 2: The method of Example 1, further comprising: wherein identifying a geographical region associated with a regulated user account comprises: detecting a user account requesting to access the virtual meeting; and determining the requesting user account is a respective regulated user account.

Example 3: The method of any Examples 1-2, further comprising: wherein capturing one or more communication channels of the virtual meeting comprises: capturing the one or more communication channels starting from an earliest virtual meeting access time of any respective regulated user account associated with the geographical region and a latest virtual meeting exit time of any regulated user account associated with the geographical region.

Example 4: The method of any Examples 1-3, further comprising: wherein a plurality of regulated user accounts accessing the virtual meeting are associated with a same identified geographical region; and wherein generating one or more archival files based on the communication channel data captured by the regional virtual meeting participant instance further comprises: generating a copy of the communication channel data for each respective regulated user account associated with the same identified geographical region.

Example 5: The method of any Examples 1-4, further comprising: wherein generating one or more archival files further comprises: generating a first archival file for a first regulated user account associated with the same geographical region, the first archival file based on one or more portions of a first copy of the communication channel data occurring between a time of access of the virtual meeting by the first regulated user account and a time of exit from of the virtual meeting by the first regulated user account; and generating a second archival file for a second regulated user account associated with the same geographical region, the second archival file based on one or more portions of a second copy of the communication channel data occurring between a time of access of the virtual meeting by the second regulated user account and a time of exit from of the virtual meeting by the second regulated user account.

Example 6: The method of any Examples 1-5, further comprising: wherein the time of access and the time of exit of the first regulated user account corresponds to a different range of time than the time of access and the time of exit of the second regulated user account.

Example 7: The method of any Examples 1-6, further comprising: wherein the respective times of access of the first and the second regulated user accounts are after the earliest virtual meeting access time; and wherein the respective times of exit of the first and the second regulated user accounts are before the latest virtual meeting exit time.

Example 8: A non-transitory computer-readable medium having a computer-readable program code embodied therein to be executed by one or more processors, the program code including instructions for: identifying a geographical region associated with a regulated user account requesting access to a virtual meeting; instantiating a regional virtual meeting participant instance for the identified geographical region; capturing, via the regional virtual meeting participant instance, one or more communication channels of the virtual meeting; generating one or more archival files based on the communication channel data captured by the regional virtual meeting participant instance; and generating one or more translated files by applying a compliance policy associated with at least one of the regulated user accounts to the one or more archival files.

Example 9: The non-transitory computer-readable medium of Example 8, further comprising: wherein capturing one or more communication channels of the virtual meeting comprises: capturing the one or more communication channels starting from an earliest virtual meeting access time of any respective regulated user account associated with the geographical region and a latest virtual meeting exit time of any regulated user account associated with the geographical region.

Example 10: The non-transitory computer-readable medium of any Examples 8-9, further comprising: wherein instantiating a regional virtual meeting participant instance for the identified geographical region comprises: instantiating a first regional virtual meeting participant instance for a first geographical region identified as associated with a first regulated user account; and instantiating a second regional virtual meeting participant instance for a second geographical region identified as associated with a second regulated user account, the first geographical region being different than the second geographical region.

Example 11: The non-transitory computer-readable medium of any Examples 8-10, further comprising: wherein capturing one or more communication channels of the virtual meeting comprises: capturing, via the first regional virtual meeting participant instance, the one or more communication channels of the virtual meeting; and capturing, via the second regional virtual meeting participant instance, the one or more communication channels of the virtual meeting.

Example 12: The non-transitory computer-readable medium of any Examples 8-11, further comprising: wherein capturing one or more communication channels of the virtual meeting comprises: capturing, via the first regional virtual meeting participant instance, the one or more communication channels starting from an earliest virtual meeting access time of any respective regulated user account associated with the first geographical region and a latest virtual meeting exit time of any regulated user account associated with the first geographical region; and capturing, via the second regional virtual meeting participant instance, the one or more communication channels starting from an earliest virtual meeting access time of any respective regulated user account associated with the different second geographical region and a latest virtual meeting exit time of any regulated user account associated with the different second geographical region.

Example 13: The non-transitory computer-readable medium of any Examples 8-12, further comprising: wherein the communication channels comprise: (1) a video stream of the virtual meeting, (2) an audio stream of the virtual meeting and (3) chat message data of the virtual meeting separate from the video stream.

Example 14: The non-transitory computer-readable medium of any Examples 8-13, further comprising: wherein generating one or more translated files comprises: transferring one or more translated files, based on communication channel data captured by the first regional virtual meeting participant instance, to a first external storage location associated with the first geographical region; and transferring one or more translated files, based on communication channel data captured by the second regional virtual meeting participant instance, to a second external storage location associated with the second geographical region.

Example 15: A communication system comprising one or more processors configured to perform the operations of: identifying a geographical region associated with a regulated user account requesting access to a virtual meeting; instantiating a regional virtual meeting participant instance for the identified geographical region; capturing, via the regional virtual meeting participant instance, one or more communication channels of the virtual meeting; generating one or more archival files based on the communication channel data captured by the regional virtual meeting participant instance; and generating one or more translated files by applying a compliance policy associated with at least one of the regulated user accounts to the one or more archival files.

Example 16: The communication system of Example 15, further comprising: wherein capturing one or more communication channels of the virtual meeting comprises: capturing the one or more communication channels starting from an earliest virtual meeting access time of any respective regulated user account associated with the geographical region and a latest virtual meeting exit time of any regulated user account associated with the geographical region.

Example 17: The communication system of any Examples 15-16, further comprising: wherein capturing one or more communication channels of the virtual meeting further comprises: for each respective regulated user account associated with the geographical region: (i) capturing a virtual meeting access time for the respective regulated user account; and (ii) capturing a virtual meeting exit time for the respective regulated user account.

Example 18: The communication system of any Examples 15-17, further comprising: wherein a plurality of regulated user accounts accessing the virtual meeting are associated with a same identified geographical region; and wherein generating one or more archival files based on the communication channel data captured by the regional virtual meeting participant instance further comprises: generating a copy of the communication channel data for each respective regulated user account associated with the same identified geographical region.

Example 19: The communication system of any Examples 15-18, further comprising: wherein generating one or more archival files further comprises: generating a first archival file for a first regulated user account associated with the same geographical region, the first archival file based on one or more portions of a first copy of the communication channel data occurring between a time of access of the virtual meeting by the first regulated user account and a time of exit from of the virtual meeting by the first regulated user account; and generating a second archival file for a second regulated user account associated with the same geographical region, the second archival file based on one or more portions of a second copy of the communication channel data occurring between a time of access of the virtual meeting by the second regulated user account and a time of exit from of the virtual meeting by the second regulated user account.

Example 20: The communication system of any Examples 15-19, further comprising: wherein generating the first archival file comprises: generating a first video file for the first regulated user account based on a first copy of communication video data; and generating a first chat file for the first regulated user account based on a first copy of communication chat data; wherein generating the second archival file comprises: generating a second video file for the second regulated user account based on a second copy of communication video data; and generating a second chat file for the second regulated user account based on a second copy of communication chat data.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method comprising:
   identifying a geographical region associated with one or more regulated user accounts requesting access to a virtual meeting;
   instantiating a regional virtual meeting participant instance for the identified geographical region by executing a bot program as a virtual meeting participant associated with the geographical region;
   capturing, via the regional virtual meeting participant instance, communication channel data from one or more communication channels of the virtual meeting;
   generating one or more archival files based on the communication channel data from the one or more communication channels of the virtual meeting; and
   generating one or more translated files by applying a compliance policy associated with at least one of the one or more regulated user accounts to the one or more archival files.

2. The computer-implemented method of claim 1, wherein identifying the geographical region associated with the regulated user account comprises: detecting a user account requesting to access the virtual meeting; and determining the requesting user account is a respective regulated user account.

3. The computer-implemented method of claim 1, wherein capturing one or more communication channels of the virtual meeting comprises:
   capturing the communication channel data from the one or more communication channels starting from an earliest virtual meeting access time of any respective regulated user account associated with the geographical region and a latest virtual meeting exit time of any regulated user account associated with the geographical region.

4. The computer-implemented method of claim 3, wherein a plurality of regulated user accounts accessing the virtual meeting are associated with a same identified geographical region; and
   wherein generating one or more archival files based on the communication channel data captured by the regional virtual meeting participant instance further comprises:
   generating a copy of the communication channel data for each respective regulated user account associated with the same identified geographical region.

5. The computer-implemented method of claim 4, wherein generating one or more archival files further comprises:
   generating a first archival file for a first regulated user account associated with the same geographical region, the first archival file based on one or more portions of a first copy of the communication channel data occurring between a time of access of the virtual meeting by the first regulated user account and a time of exit from of the virtual meeting by the first regulated user account; and
   generating a second archival file for a second regulated user account associated with the same geographical region, the second archival file based on one or more portions of a second copy of the communication channel data occurring between a time of access of the virtual meeting by the second regulated user account and a time of exit from of the virtual meeting by the second regulated user account.

6. The computer-implemented method of claim 5, wherein the time of access and the time of exit of the first regulated user account corresponds to a different range of time than the time of access and the time of exit of the second regulated user account.

7. The computer-implemented method of claim 5, wherein the respective times of access of the first and the second regulated user accounts are after the earliest virtual meeting access time; and
   wherein the respective times of exit of the first and the second regulated user accounts are before the latest virtual meeting exit time.

8. A non-transitory computer-readable medium having a computer-readable program code embodied therein to be executed by one or more processors, the program code including instructions for:
- identifying a geographical region associated with one or more regulated user accounts requesting access to a virtual meeting;
- instantiating a regional virtual meeting participant instance for the identified geographical region by executing a bot program as a virtual meeting participant associated with the geographical region;
- capturing, via the regional virtual meeting participant instance, communication channel data from one or more communication channels of the virtual meeting;
- generating one or more archival files based on the communication channel data from the one or more communication channels of the virtual meeting; and
- generating one or more translated files by applying a compliance policy associated with at least one of the one or more regulated user accounts to the one or more archival files.

9. The non-transitory computer-readable medium of claim 8, wherein capturing communication channel data from one or more communication channels of the virtual meeting comprises:
- capturing the communication channel data from the one or more communication channels starting from an earliest virtual
- meeting access time of any respective regulated user account associated with the geographical region and a latest virtual meeting exit time of any regulated user account associated with the geographical region.

10. The non-transitory computer-readable medium of claim 8, wherein instantiating a regional virtual meeting participant instance for the identified geographical region comprises:
- instantiating a first regional virtual meeting participant instance for a first geographical region identified as associated with a first regulated user account; and
- instantiating a second regional virtual meeting participant instance for a second geographical region identified as associated with a second regulated user account, the first geographical region being different than the second geographical region.

11. The non-transitory computer-readable medium of claim 10, wherein capturing communication channel data from one or more communication channels of the virtual meeting comprises:
- capturing, via the first regional virtual meeting participant instance, a first set of communication channel data from the one or more communication channels of the virtual meeting; and
- capturing, via the second regional virtual meeting participant instance, a second set of communication channel data from the one or more communication channels of the virtual meeting.

12. The non-transitory computer-readable medium of claim 11, wherein capturing communication channel data from one or more communication channels of the virtual meeting comprises:
- capturing, via the first regional virtual meeting participant instance, the first set of communication channel data from the one or more communication channels starting from an earliest virtual meeting access time of any respective regulated user account associated with the first geographical region and a latest virtual meeting exit time of any regulated user account associated with the first geographical region; and
- capturing, via the second regional virtual meeting participant instance, the second set of communication channel data from the one or more communication channels starting from an earliest virtual meeting access time of any respective regulated user account associated with the second geographical region and a latest virtual meeting exit time of any regulated user account associated with the second geographical region.

13. The non-transitory computer-readable medium of claim 12, wherein the one or more communication channels comprise: (1) a video stream of the virtual meeting, (2) an audio stream of the virtual meeting and (3) chat message data of the virtual meeting separate from the video stream.

14. The non-transitory computer-readable medium of claim 11, wherein generating one or more translated files comprises:
- transferring one or more translated files, based on communication channel data captured by the first regional virtual meeting participant instance, to a first external storage location associated with the first geographical region; and
- transferring one or more translated files, based on communication channel data captured by the second regional virtual meeting participant instance, to a second external storage location associated with the second geographical region.

15. A communication system comprising one or more processors configured to perform the operations of:
- identifying a geographical region associated with one or more regulated user accounts requesting access to a virtual meeting;
- instantiating a regional virtual meeting participant instance for the identified geographical region by executing a bot program as a virtual meeting participant associated with the geographical region;
- capturing, via the regional virtual meeting participant instance, communication channel data from one or more communication channels of the virtual meeting;
- generating one or more archival files based on the communication channel data from the one or more communication channels of the virtual meeting; and
- generating one or more translated files by applying a compliance policy associated with at least one of the one or more regulated user accounts to the one or more archival files.

16. The communication system of claim 15, wherein capturing communication channel data from one or more communication channels of the virtual meeting comprises:
- capturing the communication channel data from the one or more communication channels starting from an earliest virtual meeting access time of any respective regulated user account associated with the geographical region and a latest virtual meeting exit time of any regulated user account associated with the geographical region.

17. The communication system of claim 16, wherein capturing communication channel data from one or more communication channels of the virtual meeting further comprises:
- for each respective regulated user account associated with the geographical region:
  - (i) capturing a virtual meeting access time for the respective regulated user account; and
  - (ii) capturing a virtual meeting exit time for the respective regulated user account.

18. The communication system of claim 16, wherein a plurality of regulated user accounts accessing the virtual meeting are associated with a same identified geographical region; and
- wherein generating one or more archival files based on the communication channel data captured by the regional virtual meeting participant instance further comprises:
- generating a copy of the communication channel data for each respective regulated user account associated with the same identified geographical region.

19. The communication system of claim 18, wherein generating one or more archival files further comprises:
- generating a first archival file for a first regulated user account associated with the same geographical region, the first archival file based on one or more portions of a first copy of the communication channel data occurring between a time of access of the virtual meeting by the first regulated user account and a time of exit from of the virtual meeting by the first regulated user account; and
- generating a second archival file for a second regulated user account associated with the same geographical region, the second archival file based on one or more portions of a second copy of the communication channel data occurring between a time of access of the virtual meeting by the second regulated user account and a time of exit from of the virtual meeting by the second regulated user account.

20. The communication system of claim 19, wherein generating the first archival file comprises:
- generating a first video file for the first regulated user account based on a first copy of communication video data; and
- generating a first chat file for the first regulated user account based on a first copy of communication chat data;
- wherein generating the second archival file comprises:
- generating a second video file for the second regulated user account based on a second copy of communication video data; and
- generating a second chat file for the second regulated user account based on a second copy of communication chat data.

* * * * *